United States Patent [19]

Arnold

[11] Patent Number: 4,779,005
[45] Date of Patent: Oct. 18, 1988

[54] MULTIPLE DETECTOR VIEWING OF PIXELS USING PARALLEL TIME DELAY AND INTEGRATION CIRCUITRY

[75] Inventor: Jack L. Arnold, Pasadena, Calif.

[73] Assignee: Irvine Sensors Corporation, Costa Mesa, Calif.

[21] Appl. No.: 48,551

[22] Filed: May 11, 1987

[51] Int. Cl.$^4$ .............................................. H04N 3/14
[52] U.S. Cl. ................................ 250/578; 358/213.26
[58] Field of Search ........................ 250/578, 332, 334; 358/209, 213.17, 213.26, 213.27, 213.28

[56] References Cited

U.S. PATENT DOCUMENTS

| 3,723,642 | 3/1973 | Loakmann | 250/332 |
| 3,941,723 | 3/1976 | Wheeler | 250/578 |
| 4,529,886 | 7/1985 | Yokoyama et al. | 250/578 |
| 4,551,629 | 11/1985 | Carson | 250/578 |
| 4,555,623 | 11/1985 | Bridgewater | 250/214 A |
| 4,617,160 | 10/1986 | Belanger | 264/40.1 |
| 4,672,737 | 6/1987 | Clark | 29/579 |
| 4,675,532 | 6/1987 | Carson | 250/578 |
| 4,695,889 | 9/1987 | Portmann | 358/213.26 |

Primary Examiner—David C. Nelms
Assistant Examiner—Stephone B. Allen
Attorney, Agent, or Firm—Thomas J. Plante

[57] ABSTRACT

A focal plane electronic system is disclosed, in which a two-dimensional array of photo-detectors receives pixel information from a scanned scene. Each pixel is observed by a plurality of detectors, and their signals are summed by time delay and integration (TDI) circuitry. The TDI circuitry comprises parallel capacitors which are charged and discharged under the control MOSFET switches. The discharge timing is such that all the detector signals representing a given pixel arrive simultaneously at a summing node. Means are included for automatically reducing the effect of anomalous detector signals on the summed output. The entire TDI system is included in a Z-type three-dimensional focal plane module.

13 Claims, 4 Drawing Sheets

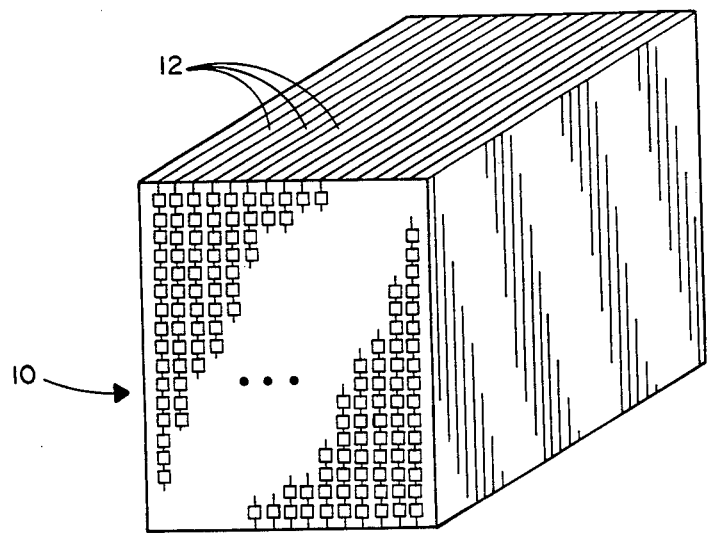
FIG. 1
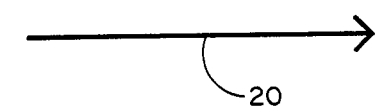
FIG. 2
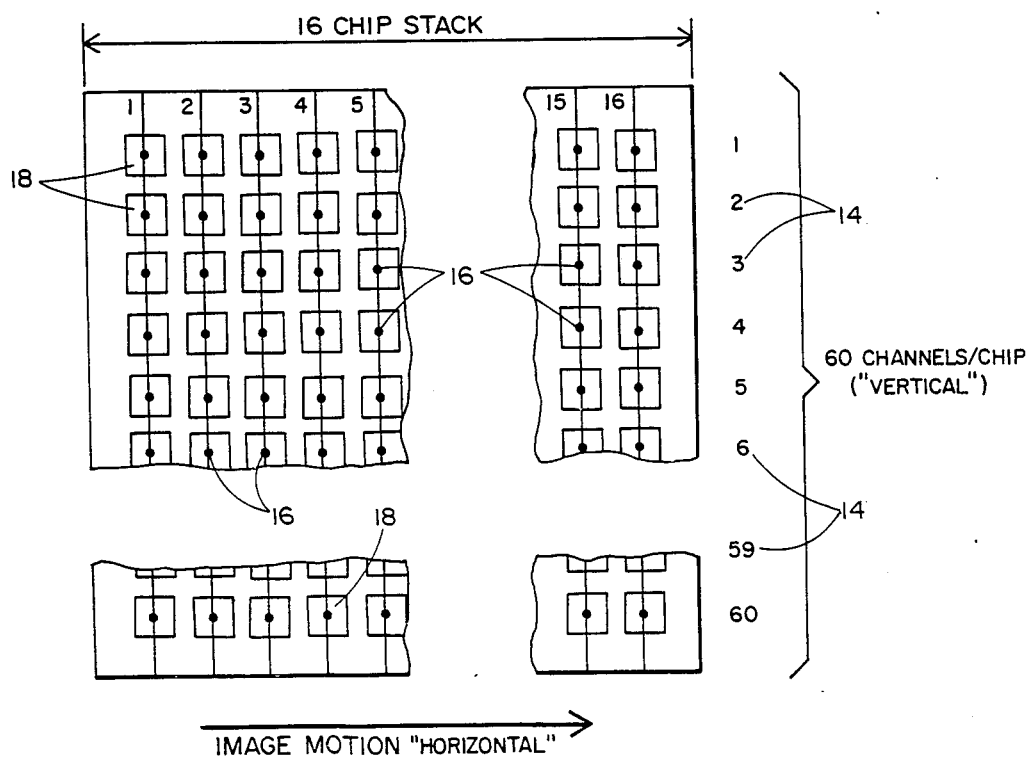

MULTIPLE DETECTOR VIEWING OF PIXELS USING PARALLEL TIME DELAY AND INTEGRATION CIRCUITRY

BACKGROUND OF THE INVENTION

This invention relates to photo-detector arrays which are combined with scanning devices to obtain the combined benefits of staring and scanning detection systems, plus additional benefits otherwise unobtainable.

The present subject matter is somewhat related to the subject matter disclosed and claimed in common assignee application Ser. No. 795,988, filed Nov. 6, 1985, now U.S. Pat. No. 4,675,532, and titled "Combined Staring and Scanning Photodetector Sensing System Having both Temporal and Spatial Filtering." That application contains extensive discussion of the advantages of such a combined staring and scanning system, which is there referred to as a "dynamic staring" system.

The operation of any scanning system requires that the successive radiation signals from a given pixel in the viewed scene by converted into an output signal representing that particular pixel. In a line array system, this may be accomplished by a direct, synchronized transfer and conversion of each pixel input signal to a corresponding output signal available to the observer.

This transfer may require integration of successive signals from a given pixel prior to electronic transfer of the pixel output. The common method used for such integration is the use of a semiconductor charge transfer device (CTD) array, such as a charge-coupled device (CCD) array, or a bucket-brigade (BB) array.

CCD arrays may also be used to integrate pixel signals in two-dimensional planar arrays of detectors, such as the system disclosed in U.S. Pat. No. 3,808,435, issued Apr. 30, 1974. That patent deals with the problem of excessive background radiation by "utilization of a quantum differential detector", which "requires a chopper" to generate an a.c. signal. As acknowledged in U.S. Pat. No. 3,808,435: "The chopper can be eliminated when the device is operated as a line scanner. In this mode the signal is proportional to changes in intensity as the scene sweeps across the detector. This mode, though potentially very useful, cannot readily be extended to a two-dimensional imager."

Many of the prior art difficulties in providing adequate photodetector signals from a two-dimensional focal plane have been solved by the "Z-technology" developed by the assignee of this application. The term "Z-technology" refers to the fact that a focal plane module, which has circuit-carrying layers perpendicular to the focal plane, has a depth dimension Z, in addition to the X and Y dimensions of the focal plane.

SUMMARY OF THE INVENTION

The present invention provides for observing each pixel in a viewed scene by a plurality of detectors, and then integrating the successive detector signals representing a given pixel by means of time delay and integration circuitry. Preferably, this system is incorporated in a Z-type module, which provides amplification and filtering of each signal prior to its time delay and integration with the other signals from the same pixel.

A plurality of pixels have time-sharing access to each of a group of detectors, thus gaining maximum signal acquisition with a miminum of real estate requirements at the focal plane.

Because the full signals provided by several detectors for each pixel are integrated, the output signal value is much greater than can be obtained with a serial transfer device, in which each signal from a given pixel is integrated by a charge transfer from one "well" to the next "well".

The signal delay portion of the circuitry comprises unique parallel combinations of capacitors and switches, preferably using MOSFET devices. The signal are stored and integrated as analog values. The desired N-sample delay is always accomplished with only two analog signal transfers.

Another aspect of the present invention is the circuitry it contains for removing, or reducing, the contribution of anomalous (defective) detector signals to the summed output from each pixel.

BRIEF DESCRIPTION OF THE DRAWINGS

FIG. 1 is an isometric view of a plurality of stacked circuit-carrying chips having a focal plane end adapted to carry a two-dimensional array of photo-detectors;

FIG. 2 is an enlarged, partially broken away, view of the focal plane, showing a photodetector array, and a scanning pattern;

DETAILED DESCRIPTION OF PREFERRED EMBODIMENT

Figure 3:
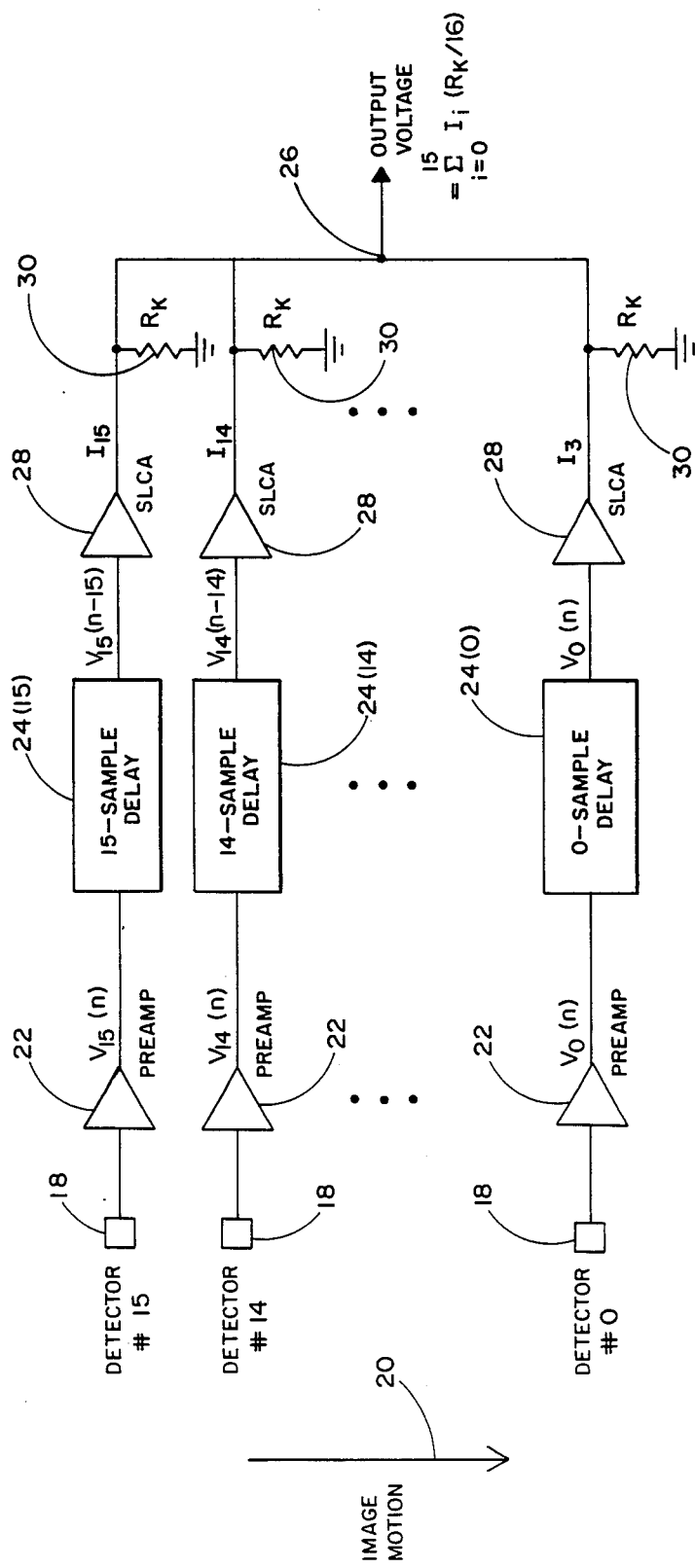
FIG. 3 is a diagram showing the signal summing system which integrates the multiple signals output by a plurality of detectors representing a given pixel.

The present invention provides a signal integrating system for a two-dimensional focal plane detector array which obtains maximum signal output, and eliminates the inefficient CCD signal processing technique. While this invention would be useful with a planar array of detectors, its maximum value is obtained in conjunction with the use of Z-technology. Common assignee patents and applications relating to Z-technology include the following: U.S. Pat. Nos. 4,551,629; 4,555,623; 4,617,160; and 4,672,737. The disclosures of the listed patents and application are incorporated herein as needed for additional understanding.

FIGS. 1 and 2 shown an integrated stack 10 comprising 16 IC chips 12, which are flat layers extending in vertical planes in this embodiment. The use of 16 chips is an arbitrary choice. Each of the 16 chips has a plurality of parallel channels (FIG. 2), each of which has a focal plane lead 16 in conductive engagement with a single photodetector 18. The number of channels per chip is assumed to be 60, also an arbitrary choice. In the illustrative embodiment, the two-dimensional focal plane has 16 columns 12 and 60 rows 14.

The image scan direction is indicated as horizontal (in FIGS. 1 and 2) by the arrow 20. With 16 detectors in each horizontal row, each pixel viewed by the scanning mechanism will provide separate signals from all 16 detectors, i.e., a redundancy of 16 in obtaining a signal from each pixel. Summing these 16 redundant signals provides a particularly effective pixel output signal. Mounting the chips 12 in planes perpendicular to the scan direction allows the stack to contain a relatively small number of chips.

The vertical distances between adjacent leads 16, i.e., the center-to-center distance between detectors 18, may be chosen for maximum focal plane efficiency. A typical center-to-center detector spacing is 50 microns, with each detector having dimensions of 38 microns by 38 microns. In the vertical dimension, pixel spacing is equal to detector spacing. The horizontal distances between adjacent pixels will be determined by the scanning speed, sampling frequency, and width of the scanned area. In order to avoid any ambiguities in the output signals, it is preferable that the pixel spacing be identical in the vertical and horizontal directions, i.e., 50 microns.

FIG. 2 illustrates the layout of the focal plane. The individual detectors 18 are arranged in vertical columns numbered from 1 to 16 and in horizontal rows numbered from 1 to 60. Under each detector is the channel lead 16 by which the detector signal is conducted to the interior of stack 10, where it is processed by the integrated circuitry, which is located on the surface of the respective chip.

FIG. 3 shows the circuitry layout of one of the 60 channels. In other words, it represents the summing circuitry which integrates the 16 signal samples from a given pixel, which samples are separately provided by the 16 detectors mounted in a row parallel to the scanning motion (arrow 20). The detectors are identified as detector #0 through detector #15. Each detector 18 should have its output amplified by its own preamp 22, before entering the integrate and hold circuitry.

As shown, the amplified output from detector #15 enters a 15-sample delay circuit 24 (15); the amplified output from detector #14 enters a 14-sample delay circuit 24 (14); and so on, ending with detector #0, whose amplified output enters a 0-sample delay circuit 24 (0). Suitable timing (clock) circuit signals are directed to the sample-delay circuits, for the purpose of causing appropriate time delays of the 16 samples, which are periodically summed, and connected to an output node 26.

In order to provide the advantage of discounting (reducing the gain) of anomalous detector signals, each sample delay circuit is fed to the output node 26 through a sample limiting channel amplifier (SLCA) 28, the details of which will be described below.

In the illustrated version of the invention, the variations in detector voltages caused by incoming radiation signal variations leave the SLCA's 28 as current signals. They are converted to voltage signals by the resistor 30 in each parallel circuit, and are summed as voltages at node 26. This particular handling of the signals is not mandatory, and may be altered to suit particular situations. However, an integrated (summed) signal for each pixel will be output via node 26. Node 26 will receive signals seriatim from the pixels which are viewed in each row during successive scanning sweeps. The image velocity is one pixel per sample interval. At any given pixel sample time, each detector 18 will be receiving its signal from a different pixel.

At the instant when the voltage at the 0-sample delay circuit is caused by the clock to provide current flow to create a voltage at node 26, each of the voltages stored at the other 15 delay circuits will have completed its waiting period, and will be caused by the clock to provide current flow to create a voltage at node 26. The output voltage at node 26 will thus sum the signals at all 16 detectors. Because each pixel signal is made up of the summation of 16 statistically independent samples, signal-to-noise performance is theoretically improved by a factor of 4.

Heretofore, sampled analog delay lines have been provided by CCDs, which require the serial switching of signals along a line of multiple storage elements, or wells. Since the final well in a 16 unit CCD array would contain the total charge, each unit could add only one-sixteenth of the total without overflowing the well capacity. Therefore, the improved signal-to-noise ratio is unattainable on large signals with a CCD array.

Figure 4:
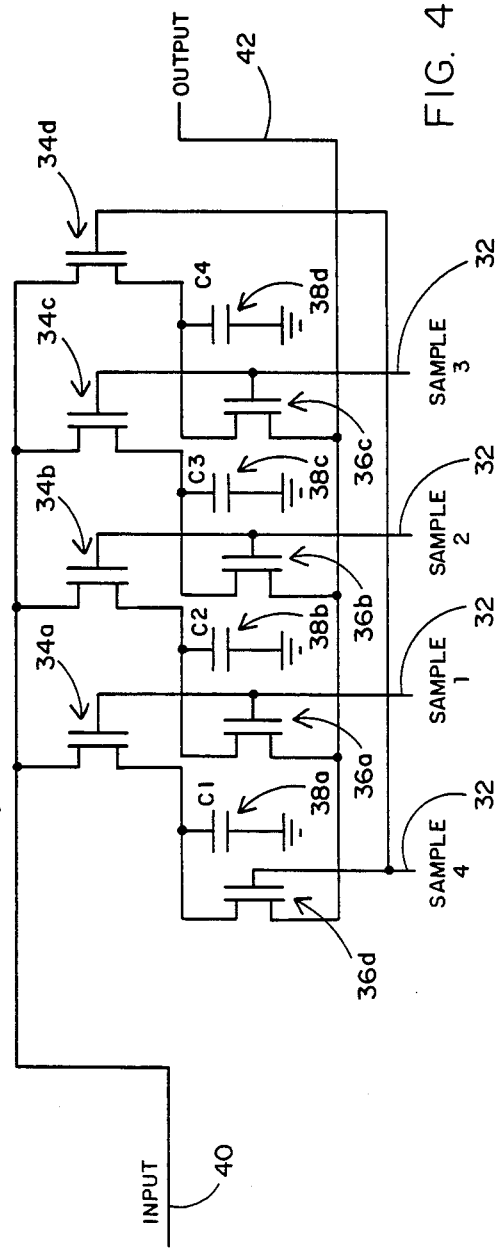
FIG. 4 is a simplified diagram of the unique delay and integration circuitry, using a three sample delay circuit for the purpose of simplified description.

The unique TDI circuitry is illustrated in FIG. 4. Instead of showing a 16 sample delay line, as in FIG. 3, FIG. 4 illustrates a 3 sample delay, for the sake of simplicity. It is capable of providing a 3 sample delay, or any shorter delay. In other words, by using fusible links, portions of the circuitry of FIG. 4 may be short-circuited. Therefore, depending on the position of the delay line of FIG. 4 along the line of the scan, it may be used to hold the signal 3 clock periods, 2 clock periods, 1 clock period, or 0 clock periods.

The clocking signals enter the circuitry of FIG. 4 on four lines 32 labeled, respectively, sample 1, sample 2, sample 3, and sample 4. In order to provide a maximum 3 sample delay, 4 clock lines, and 4 switch/capacitor combinations are needed. Each such combination comprises an input switch 34, an output switch 36, and a charge holding capacitor 38. Preferably, all of the switches are MOSFET transistors. An input line 40 inputs successive signals from the detector channel to which the integrator is dedicated. An output line 42 outputs clock-timed, delayed, signals to the summing node 26 (FIG. 3).

At any given time only one of the four clock signals is actuated. When a clock signal arrives on the "sample 1" line, transistor 34a is caused to conduct current, transferring the available input signal to capacitor 38a, where it remains as a stored charge. Simultaneously, transistor 36a is caused to conduct current, transferring the charge previously stored at capacitor 38b to output line 42. When a clock signal arrives on the "sample 2" line, transistor 34b is caused to conduct current, transferring the available input signal to, and storing it at, capacitor 38b, which is now cut off from output line 42 by the turned off switch 36a. Simultaneously, transistor 36b is caused to conduct current, transferring the charge previously stored at capacitor 38c to output line 42. A clock signal on the "sample 3" line turns on transistor 34c, charging capacitor 38c; and turns on transistor 36c, discharging capacitor 38d. And a clock signal on the "sample 4" line turns on transistor 34d, charging capacitor 38d; and turns on transistor 36d, discharging capacitor 38a.

Figure 5:
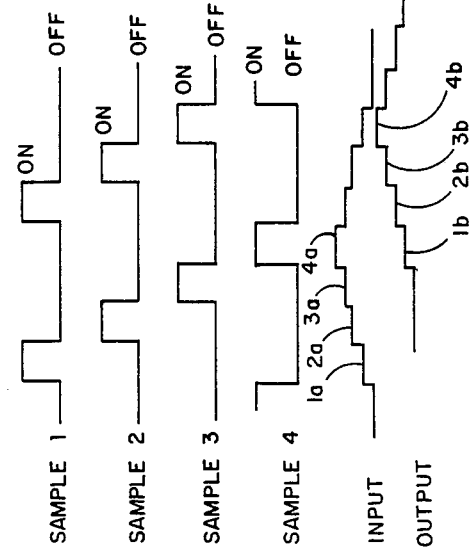
FIG. 5 is a time diagram illustrating the clocking of the repeating sample sequence.

FIG. 5 is a timing diagram which compares the input and output timing. The four signals on the input line 40 are marked 1a, 2a, 3a, and 4a. The four corresponding signals on the output line 42 are marked 1b, 2b, 3b, and 4b.

The issue arises whether it is necessary to duplicate the entire 16 signal delay line circuit in each channel. There is a tradeoff consideration. On one side, there is the desire to convserve real estate. On the other side, there is the desire to have manufacturing uniformity of the chips.

It is considered important to inclulde the TDI circuitry within the Z-technology module. That module preferably includes, in addition to the detectors and pre-amplifiers for each channel, bandpass filters, TDI circuitry, and multiplexer circuitry. It is important to minimize the number of leads which exit from the backplane of the module to connect to exterior (off focal plane) circuitry. Multiplexing is provided for successive pixels viewed by each row of detectors, whose signals are summed at the output node. Mulitplexing also is desired to output serially the signals from successive channels in the columns provided along the surface of each chip. This circuitry can be, at least partially, provided by thin film metallization applied to the back plane of the module.

The TDI circuitry shown in FIG. 4 is considered to be a unique and highly advantageous solution to the problem of successfully integrating redundant samplings of a given pixel obtained by scanning. In some prior art techniques, time delay and integration is accomplished digitally away from the focal plane. Referring to analog sample delay lines, the prior efforts have involved the use of CCDs, which require serial switching of signals along a line of multiple storage elements.

In a 16-sample CCD series, the maximum value of each detector charge packet is 1/16 of the well capacity of the CCD. The charge transfer efficiency (CTE) of individual CCD elements varies considerably with position on the chip. It also changes with signal level, time, and temperature, making its effect difficult to predict and remove with other fixed pattern noise. The charge from the first column of detectors must be shifted through this CTE mechanism at least 16 times, enhancing the error by a power of 16. The nature of the CCD device is such that circuit topology is unchangeable after manufacture. Cells are constrained to be adjacent by the nature of the charge transfer process. A single defective element in the CCD should reject the entire device. Should a single detector element contain a defect which produces data that is vastly different from the others in its TDI string, there is no way to compensate for it. It will unduly bias the integration process and produce a bad pixel. Should the defect last longer than a column time, then many pixels will be affected.

The delay analog circuitry of the present invention requires only two analog transfers, each of which uses CMOS switches, storage capacitors, and buffer amplifiers. The effective CTE is thus stable and nearly unity. The entire dynamic range of the CMOS analog circuitry is available to each detector, with scaling being accomplished at the summing buffers. Fusible link programming may be included which allows the detouring of the signal path around certain chip defects after manufacture, thus increasing yield on analog signal processing chips. Implementation with standard CMOS elements allows the construction of chip elements which detect and reduce the effect of single anomalous detector readings, whether they are single events in time, or due to permanently damaged elements.

Figure 6:
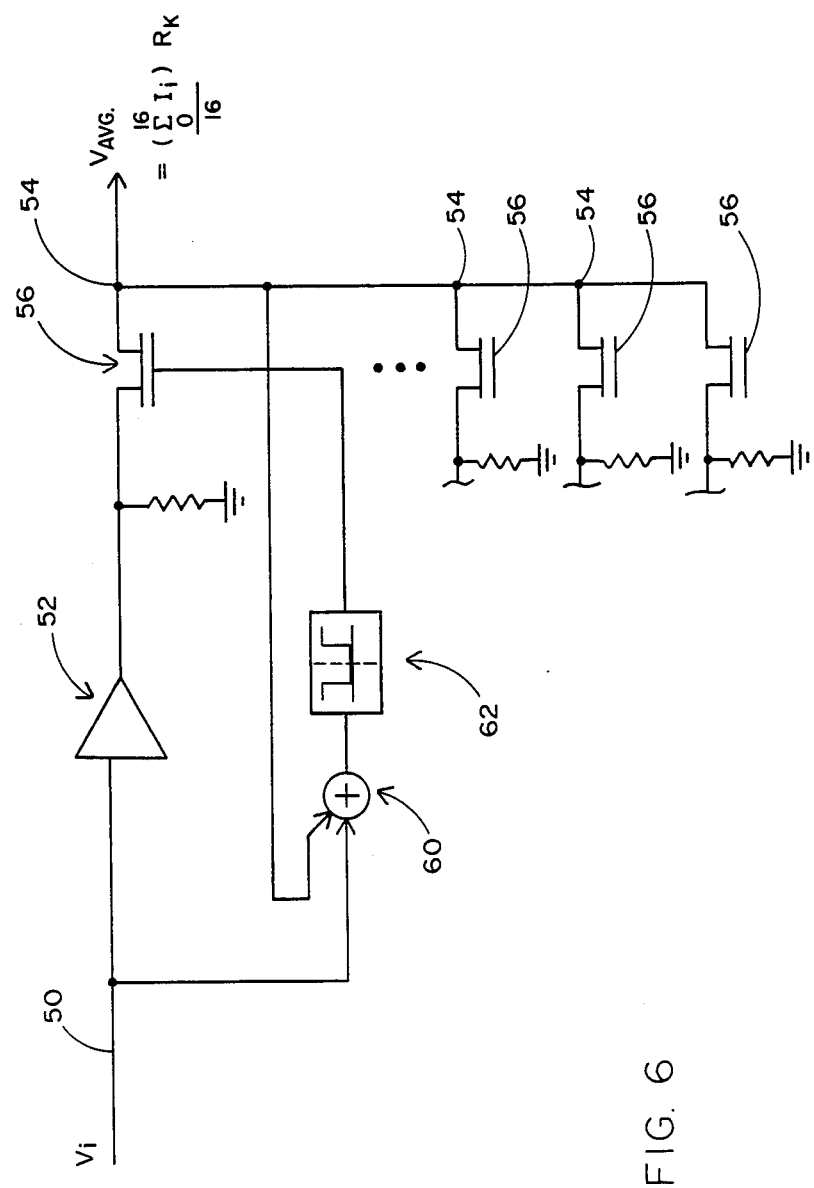
FIG. 6 is a schematic showing the circuitry which automatically reduces the effect of an anomalous detector signal.

Another important advantage of the present invention is illustrated by the circuitry in FIG. 6. The input voltage signal V(i) from the delay circuit enters on line 50. It is converted into a current signal by a voltage-to-current converter 52; and that current goes to an output node 54, after passing through a CMOS transistor switch 56. Each parallel line from the other delay circuits has a similar switch 56 ahead of summing node 54. All of the switches 56 in the 16 parallel lines are normally turned on. The voltage V(o) at the output node 54 is equal to the average current of the 16 parallel lines multiplied by the value R(k)/16 of the parallel load resistance 58 which is included in each parallel line.

The summed output voltage V(o) is compared to the input voltage V(i) of each line by a device 60, which may comprise two oppositely directed diodes. The device 60 controls a bi-directional threshold switch 62, which is capable of turning off the switch 56 in the individual line. If the voltage difference between the summed output voltage V(o) and the individual input voltage V(i) is greater than a threshold value, i.e., if either voltage is greater or less than the other by a predetermined around, the threshold switch 62 turns off the line switch 56, causing the signal of that line to be eliminated from the summed output voltage. Thus, anomalous behavior of an individual line is prevented from creating a misleading output signal.

This function of limiting the contribution of malfunctioning detectors is not possible in a CCD delay system, because of the serial transfer of charges from well to well.

From the foregoing description, it will be apparent that the apparatus disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. A radiation sensing and decoding system comprising:
    a plurality of separate photodetectors;
    means for scanning a viewed scene to cause a given pixel in that scene to cause successive output signals at each of the separate photodetectors;
    a plurality of parallel circuits associated with each photodetector for receiving its output signals;
    means in each parallel circuit capable of storing the photodetector output signal representing a given pixel until a discharge signal is received; and
    means for providing simultaneous discharge signals in the appropriate circuits respectively associated with each photodetector in order to output simultaneously all signals produced by a given pixel.

2. The radiation sensing and decoding system of claim 1 in which the photodetectors are arranged in a two-dimensional array, one dimension of which is parallel to the scanning direction, in order to provide redundant viewing of individual pixels, and the other dimension of which is perpendicular to the scanning direction, in order to provide a multiplicity of separate channels for simultaneous scanning.

3. The radiation sensing and decoding system of claim 1 in which each parallel circuit comprises:
    capacitors for temporarily storing a photodetector signal;
    input switches which cause signals from the photodetector to charge the capacitors;
    output switches which cause the capacitors to be discharged as an output signals; and
    timing means for controlling the input and output switches.

4. The radiation sensing and decoding system of claim 1 which also comprises:
    means for serially inputting to each photo-detector radiation at successive pixel locations.

5. The radiation sensing and decoding system of claim 3 in which the input and output switches are MOSFET transistors.

6. The radiation sensing and decoding system of claim 4 which comprises:
- a three-dimensional module composed of circuit-carrying layers perpendicular to the two-dimensional photo-detector array;
- each of which layers has (a) a plurality of leads for conducting signals from individual photodetectors; and (b) signal-manipulating circuitry located on the layer and embedded in the three-dimensional module.

7. The radiation sensing and decoding system of claim 6 in which the planes of the circuit-carrying layers are perpendicular to the scanning direction.

8. The radiation sensing and decoding system of claim 6 in which each circuit-carrying layer includes:
- an amplifier for signals from each detector;
- a bandpass filter for signals from each detector; and
- a time delay and integration circuit for signals from each detector.

9. The radiation sensing and decoding system of claim 8 in which the three-dimensional module includes:
- means for multiplexing successive summed signals from redundantly viewed pixels; and
- means for multiplexing signals from successive photo-detector channels provided on a given circuit-carrying layer.

10. A radiation sensing and decoding system comprising:
- a plurality of separate photodetectors;
- means for scanning a viewed scene to cause a given pixel in that scene to provide successive output signal at each of the separate photodetectors;
- time-differentiating means for causing the signal output of each detector to have a different time delay from the time delays of the other detectors, the time-differentiating means including a plurality of storage means in parallel circuits, and clock-controlled means for charging and discharging such storage means; and
- summing means for causing synchronous outputs of all the photodetector signals produced by a given pixel.

11. The radiation sensing and decoding system of claim 10 in which the synchronous outputs are combined at a summing node, and which also comprises:
- means for comparing the summing node signal with each individual detector signal; and
- means controlled by the comparing means for reducing the effect of the individual detector signal if it differs substantially from the summing node signal.

12. The radiation sensing and decoding system of claim 10 in which the time-differentiating means comprises:
- a plurality of capacitors in parallel circuits;
- an input line receiving time input signals from each photodetector;
- an output line receiving timed output signals; and
- capacitor control means for simultaneously causing one capacitor to be charged by an input signal and another capacitor to be discharged on the output line.

13. The radiation sensing and decoding system of claim 12 in which each capacitor control means comprises:
- a first MOSFET switch between it and the input line; and
- a second MOSFET switch between it and the output line.

* * * * *